United States Patent
Sheng et al.

(10) Patent No.: US 7,630,105 B2
(45) Date of Patent: Dec. 8, 2009

(54) BOOK SCANNER WITH ENHANCED EDGE IMAGE QUALITY

(75) Inventors: Thomas Sheng, Hsinchu (TW); Devon Shyu, Tainan County (TW)

(73) Assignee: Avision Inc. (TW)

( * ) Notice: Subject to any disclaimer, the term of this patent is extended or adjusted under 35 U.S.C. 154(b) by 1015 days.

(21) Appl. No.: 10/856,947

(22) Filed: Jun. 1, 2004

(65) Prior Publication Data
US 2004/0218231 A1 Nov. 4, 2004

Related U.S. Application Data

(63) Continuation-in-part of application No. 08/848,246, filed on Apr. 29, 1997, now abandoned.

(30) Foreign Application Priority Data

Dec. 3, 2003 (TW) ............................... 92134042 A
Mar. 22, 2004 (TW) ............................... 93107611 A

(51) Int. Cl.
*H04N 1/04* (2006.01)
(52) U.S. Cl. ...................... 358/497; 358/507; 358/509; 358/475
(58) Field of Classification Search ................. 358/497, 358/507, 509, 475, 485, 473, 510, 480, 481, 358/474, 505; 399/220, 221, 362, 380; 355/25, 355/75, 113, 128, 129, 131, 82, 83, 84; 439/602
See application file for complete search history.

(56) References Cited

U.S. PATENT DOCUMENTS

| | | | | |
|---|---|---|---|---|
| 5,475,505 A | * | 12/1995 | Minasian et al. | ............. 358/474 |
| 5,659,404 A | * | 8/1997 | Matsuda | ...................... 358/474 |
| 5,768,663 A | * | 6/1998 | Lin | .............................. 399/220 |
| 5,812,285 A | * | 9/1998 | Lin et al. | ..................... 358/497 |
| 5,847,846 A | * | 12/1998 | Wu et al. | ..................... 358/475 |
| 5,950,053 A | | 9/1999 | Lin | |
| 6,133,580 A | | 10/2000 | Sun | |
| 6,351,624 B1 | * | 2/2002 | Hiruta | ......................... 399/380 |
| 6,459,510 B1 | * | 10/2002 | Brewer et al. | ................ 358/497 |
| 6,486,978 B1 | * | 11/2002 | Tsai | ............................ 358/475 |
| 7,006,263 B2 | * | 2/2006 | Takahashi | .................... 358/474 |
| 7,268,923 B2 | * | 9/2007 | Schroath et al. | ............. 358/474 |
| 2004/0021915 A1 | * | 2/2004 | Lee et al. | ..................... 358/497 |

\* cited by examiner

*Primary Examiner*—Houshang Safaipour

(57) ABSTRACT

A book scanner for scanning a book having first and second inner surfaces and a ridge. The scanner includes a transparent platen for supporting the first inner surface, a housing, and a scanning module. The housing has a housing platen for supporting the second inner surface, and the housing and transparent platen are connected to define a first angle smaller than 180 degrees. The module is moved along a direction parallel to the ridge to scan the first inner surface. The module includes a lighting device having first and second sections. The two sections define a second angle smaller than 180 degrees; and the second section has a second end, and a first end closer to a first plane containing the transparent platen than the second end. The bent second section may provide extra light rays to compensate the brightness and thus enhance the edge image quality.

17 Claims, 7 Drawing Sheets

BOOK SCANNER WITH ENHANCED EDGE IMAGE QUALITY

CROSS-REFERENCE TO RELATED APPLICATION

This application is a Continuation-in-Part of application Ser. No. 08/848,246 filed on Apr. 29, 1997 now abandoned, which designated the United States, and on which priority is claimed under 35 U.S.C. § 120. This application also claims priority under 35 U.S.C. § 119(a) on patent application Ser. Nos. 092134042 & 093107611 filed in TAIWAN on Dec. 3, 2003 & Mar. 22, 2004; repectively. The entire contents of each of the above documents is hereby incorporated by reference.

BACKGROUND OF THE INVENTION

1. Field of the Invention

The invention relates to a book scanner with enhanced edge image quality, and more particular to a book scanner having a bent lighting device to compensate for the edge brightness of the lighting device.

2. Description of the Related Art

The flat-bed image scanner has been widely used as a peripheral equipment for computers. It can scan the text of documents, magazines, books, graphs, etc. or pictures for further processing in the computer.

A flat-bed scanner is composed of an optical reading unit, a driving unit, a picture processing circuit, a transparent scanning window and a frame. The development trend today is to make the scanner lighter, thinner, shorter and smaller, so that the scanner can occupy less space.

FIG. 1 shows a linear light source 101 of a conventional design. Element 11 is the frame, over which a scanning window 12 rests. The scanning window 12 has an effective scanning area 12a. The area 12b is an ineffective scanning area because the area has poorer lighting due to the end section construction of a typical fluorescent lamp. This area 12b is used for connecting the scanning window 12 with the frame 11.

FIG. 2 shows the effective illumination area of the linear light source of the conventional design. The drawback of the linear light source is that the illumination of the lamp 101 at the two ends 101b is weaker than the central portion of the light source. The weaker lighting areas cause poorer illumination at the two edges of the exposed document and degrade the quality of the scanned image. Only the central portion 101a of the linear lamp 101 can scan the scanning window effectively, maintaining a high quality image. To solve the poor illumination at the two ends of the lamp, a conventional practice is to elongate the lamp. The elongated length makes the poorly illuminated region 101b lie outside the effective illumination region 101a. The drawback of this structure is the extension of the linear lamp, thus increasing the volume of the scanning equipment to accommodate the increased length of the lamp. Although the extension is not much, the frame of the scanner must be increased substantially in terms of volume and weight.

In U.S. Pat. No. 5,475,505, a U-shaped lighting tube or an Ω-shaped lighting tube is used to solve the poor end zone illumination problem. In the U-shaped lighting tube design, two parallel tubes are connected at one end but opened at the other end. Although this design can reduce the size of the scanning unit and improve the quality of illumination at the connected end of the tubes, the quality of illumination at the other open end of the tubes is not improved. In the U.S. Pat. No. 5,475,505, the open end of the tube is extended outward into Ω-shape. With this design, the poorly illuminated end is extended to increase the illumination at that end. However, such a design requires more tube material. The function of this invention is to increase the illumination of the two poorly illuminated ends with less material.

Consequently, the lamp tube used in the conventional scanner usually has uneven brightness distribution because the brightness at the middle of the lamp tube is higher and evener while the brightness at two ends of the tube is low. Hence, using the lamp tube with uneven brightness to scan the document cannot obtain good scan results. In order to solve this problem, the above-mentioned U-shaped lamp tube has been proposed to compensate for the edge brightness of the lamp tube.

FIG. 3 is a schematic illustration showing that the U-shaped lamp tube is used to compensate for the edge brightness. As shown in FIG. 3, the U-shaped lamp tube 110 of the scanner has a bent portion 112, which is correspondingly located around the edge of the document 100 and fixed to the scanning module 140 by a fixer 120. Because extra light rays may compensate for the edge brightness of the document 100, the scan quality can be enhanced.

FIG. 4 is a partially schematic illustration showing that the lamp tube of FIG. 3 is applied to a book scanner. As shown in FIG. 4, the housing 150 of the book scanner 130 typically has a housing platen 152 for supporting the book together with the transparent platen 160. In addition, in order to maintain a fixed amount of brightness of the lamp tube to be illuminated on the book, the distance from the lamp tube 110 to the transparent platen 160 usually cannot be too large. Consequently, even if the U-shaped lamp tube 110 contacts the housing platen 152, sufficient light rays around the binding edge of the book still cannot be provided because the slanting housing platen 152 restricts the left extensible range of the U-shaped lamp tube 110 in FIG. 4. In addition, the U-shaped lamp tube 110 cannot be easily manufactured, so its cost is high. In addition, the fixer 120 for fixing the U-shaped lamp tube 110 to the scanning module 140 usually has a high price and a poor fixing effect, or the fixer 120 may shield a portion of the light rays and thus influence the brightness compensation.

The compensation technology of the lamp tube brightness may be found in U.S. Pat. Nos. 5,475,505; 5,768,663; 5,950,053; and 6,133,580, wherein the disclosed lamp tubes have many types for compensating for the edge brightness. However, these lamp tubes and the configurations thereof may encounter the above-mentioned problems in use.

Therefore, it is an important subject of the invention to provide a book scanner capable of compensating for the edge brightness when scanning the book.

SUMMARY OF THE INVENTION

It is therefore an object of the invention to provide a book scanner with enhanced edge image quality, wherein a bent lighting device is disposed to conform to the shape of the slanting housing platen of the book scanner so as to provide the effective compensation for the light rays and thus enhance the edge image quality of the scanned document.

The invention achieves the above-mentioned object by providing a book scanner for scanning a book having a first inner surfaces, a second inner surface and a ridge. The scanner includes a transparent platen for supporting the first inner surface, a housing, and a scanning module. The housing has a housing platen for supporting the second inner surface, and the housing and transparent platen are connected to define a first angle smaller than 180 degrees. The module is moved along a direction parallel to the ridge to scan the first inner surface. The module includes a lighting device having first and second sections. The two sections define a second angle smaller than 180 degrees; the second section has a first end and a second end. And the first end is closer to a first plane containing the transparent platen than the second end is. The bent second section may provide extra light rays to compensate the brightness and thus enhance the edge image quality.

The first angle is preferably equal to the second angle, and the first and second sections of the lighting device are preferably fixed to the scanning module by a first fixer and a second fixer, and slide on the inner surfaces of the housing platen and the transparent platen, respectively.

The lighting device may be a cold cathode fluorescent lamp, or may be composed of a plurality of LEDs (Light-Emitting Diodes) or a plurality of OLEDs (Organic Light-Emitting Diodes).

DETAILED DESCRIPTION OF THE INVENTION

The preferred embodiments of the invention will be described with reference to the accompanying drawings. The spirit of the invention resides in that the bent lighting device is disposed to conform to the slanting structure of the housing platen of the book scanner so as to provide effective brightness compensation for the light rays.

Figure 5:
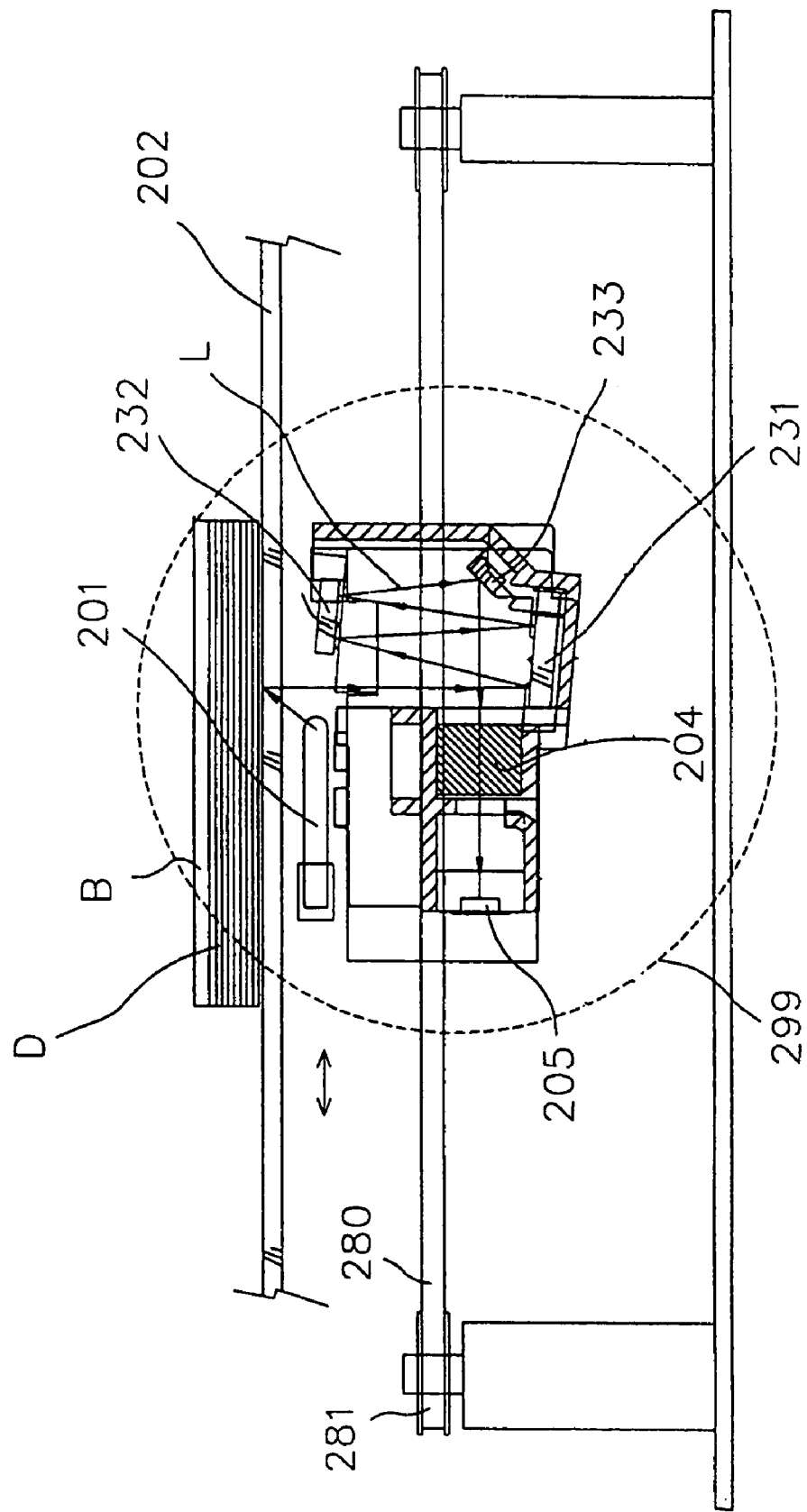
FIG. 5 shows the basic structure of a first embodiment of the present invention.

FIG. 5 shows the basic structure of the image scanner of the present invention. The optical reading unit includes a light source 201, reflecting mirrors 231, 232, 233, a lens 204 and a light sensor 205. The light source 201 is customarily a fluorescent lamp.

The operation of a flat-bed image scanner is described as follows. A document D to be scanned is placed on a scanning window 202. The document may have a binding edge B. When the document is illuminated with the light source 201, the reflected light passes through a series of reflecting mirrors 231, 232, 233 and the lens 204 to reach the sensor 205. The sensor 205 processes the image signal to become digital data, which are further processed in a computer. When the sensor completes a row of image signal, the belt 280 and the roller 281 move the optical image reading unit to a next scanning area, and continues until the complete image is scanned.

Figure 6:
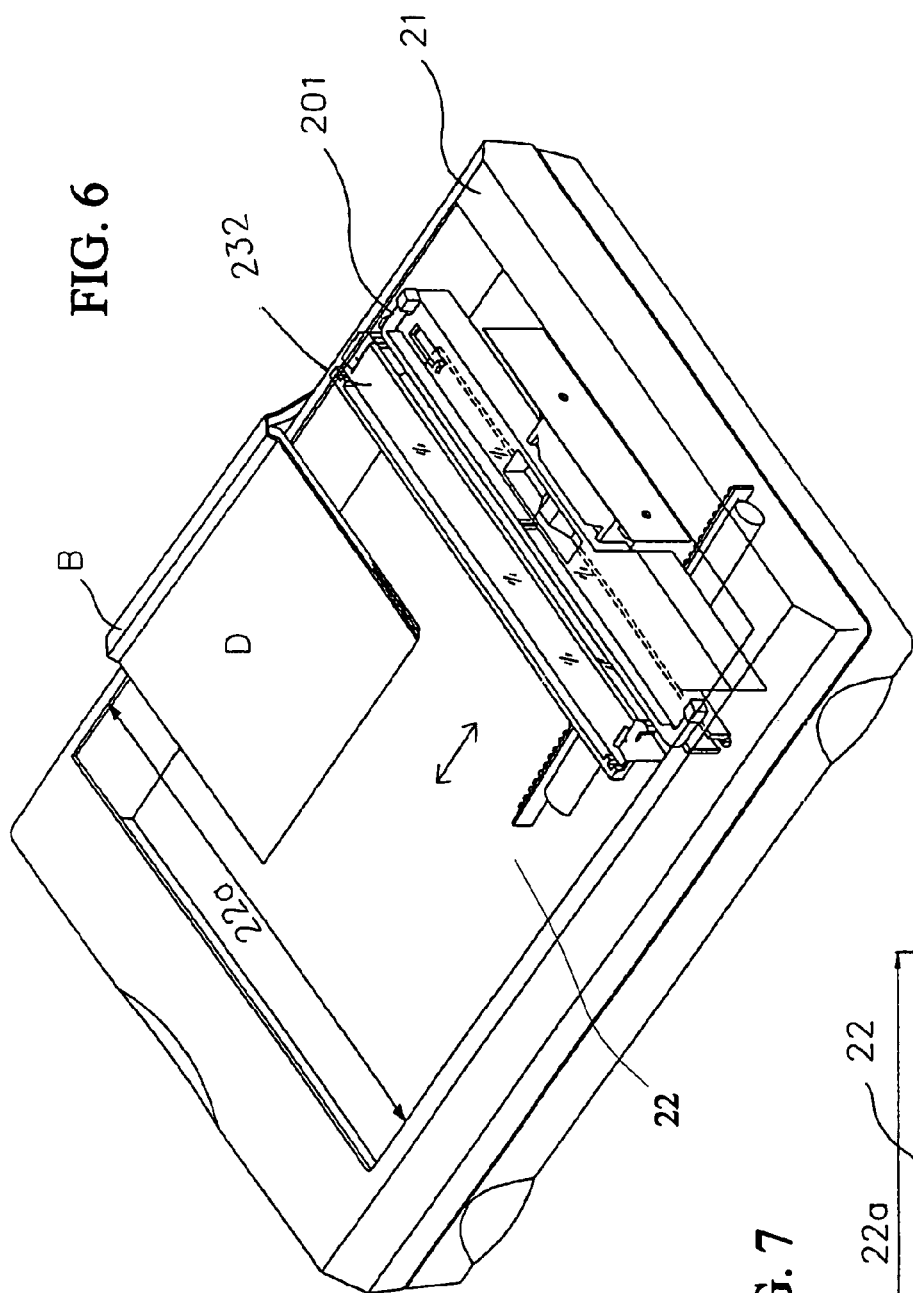
FIG. 6 shows the structure of a bent light source based on the present invention.

FIG. 6 shows the bent bulb structure of the light source of the present invention. The light source uses a bent lamp 201.

Figure 7:
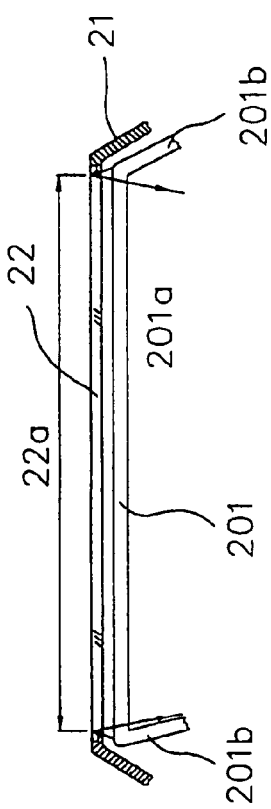
FIG. 7 shows the effective illumination area of the bent light source.

FIG. 7 shows the effective illuminated area 201a of this bent tube lamp 201. This invention uses a bent design for the two ends of the poorly illuminated regions 201b. The ends of the tube may be bent in any direction. As shown in FIGS. 6 and 7, the ends are bent in parallel with the surface of the window. The scanning window 22 has an effective region 22a. The element 21 is used to support the scanning window on the frame. Thus, the space occupied by the poorly illuminated region 101b in a conventional design is eliminated.

Figure 1:
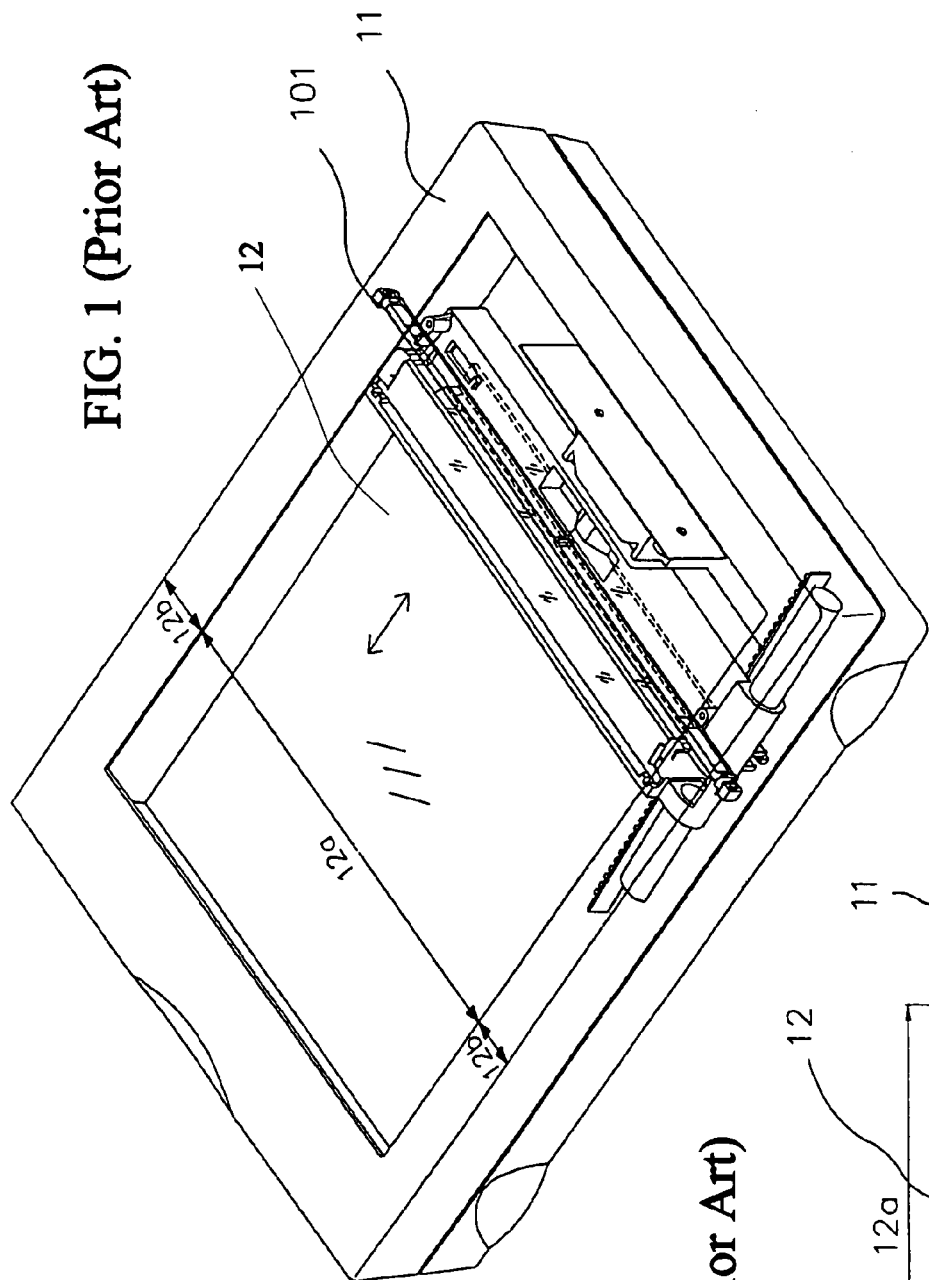
FIG. 1 shows the operation of a linear light source of the prior art.
Figure 2:
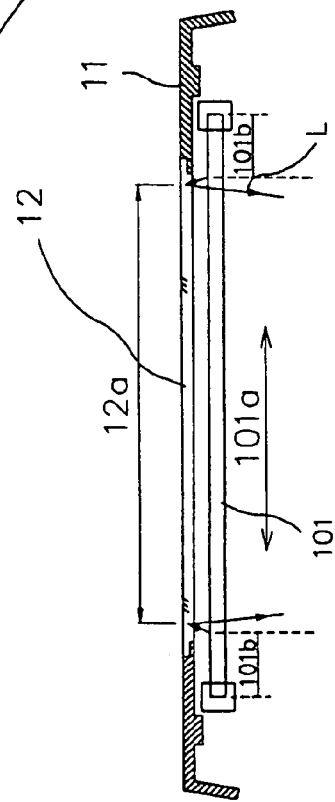
FIG. 2 shows the effective area of the linear light source of the prior art.
Figure 3:
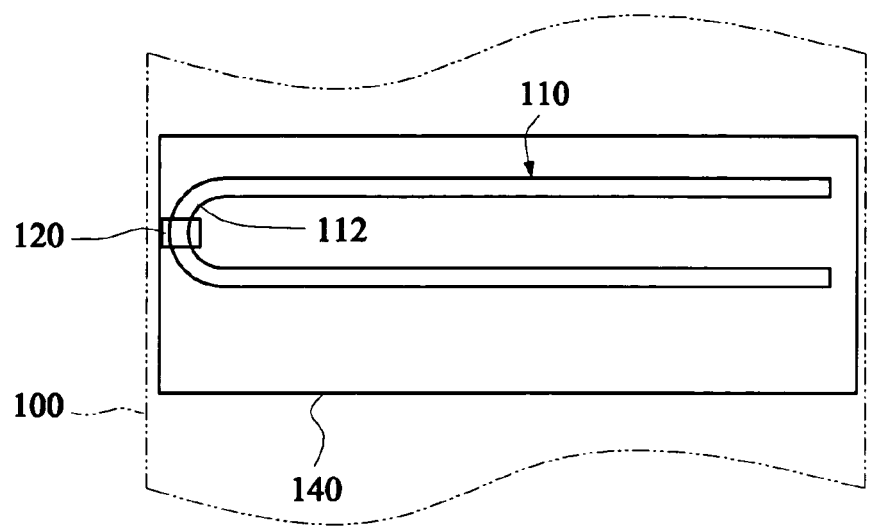
FIG. 3 is a schematic illustration showing that the U-shaped lamp tube is used to compensate for the edge brightness.
Figure 4:
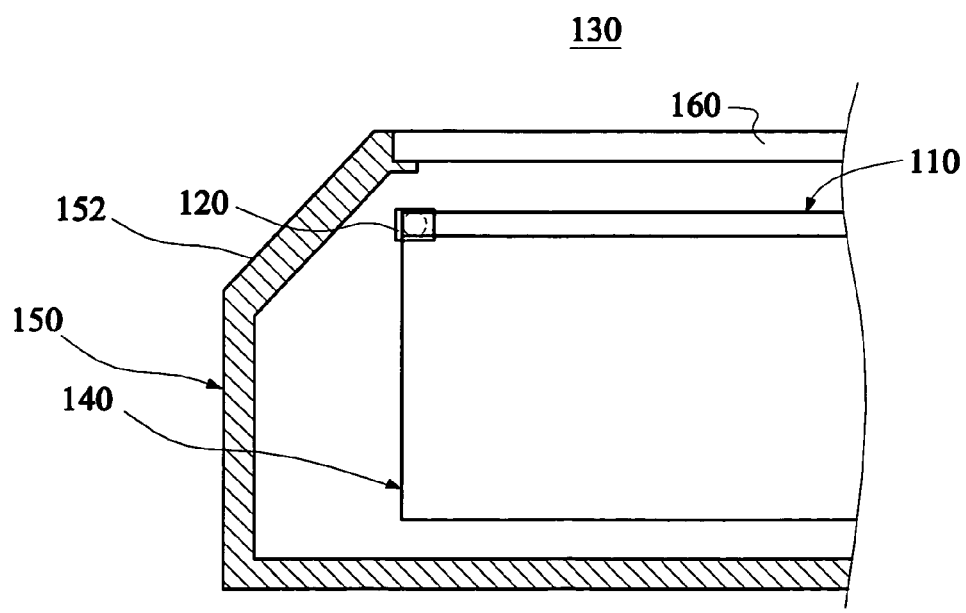
FIG. 4 is a partially schematic illustration showing that the lamp tube of FIG. 3 is applied to a book scanner.

In comparison with the linear lamp 101 shown in FIGS. 1 and 2, the bent tube 201 can decrease the volume of the scanner and maintain equal quality throughout the scanned document D from the middle to the binding edge. Although the linear lighting tube 101 of a conventional design can maintain equal quality throughout the scanned document, the extension at the two ends 101b of the tube makes the overall size of the scanner bigger.

In comparison with the conventional U-shaped lighting tube, the present invention has the advantage of using less tube material while maintaining uniform quality for the middle of the scanned document as well as the area near the binding edge of the document.

In comparison with the Ω-shaped lighting tube, the bent lighting tube 201 of the present design has the advantage of using less tube material. Meanwhile, the quality of the illuminated document is maintained equally in the middle area as well as the area near the binding edge of the document. Although the Ω-shaped lighting tube can illuminate the sensor at the two ends of the lamp equally well, the Ω-shaped tube consumes more tube material and occupies more tube space.

Figure 8:
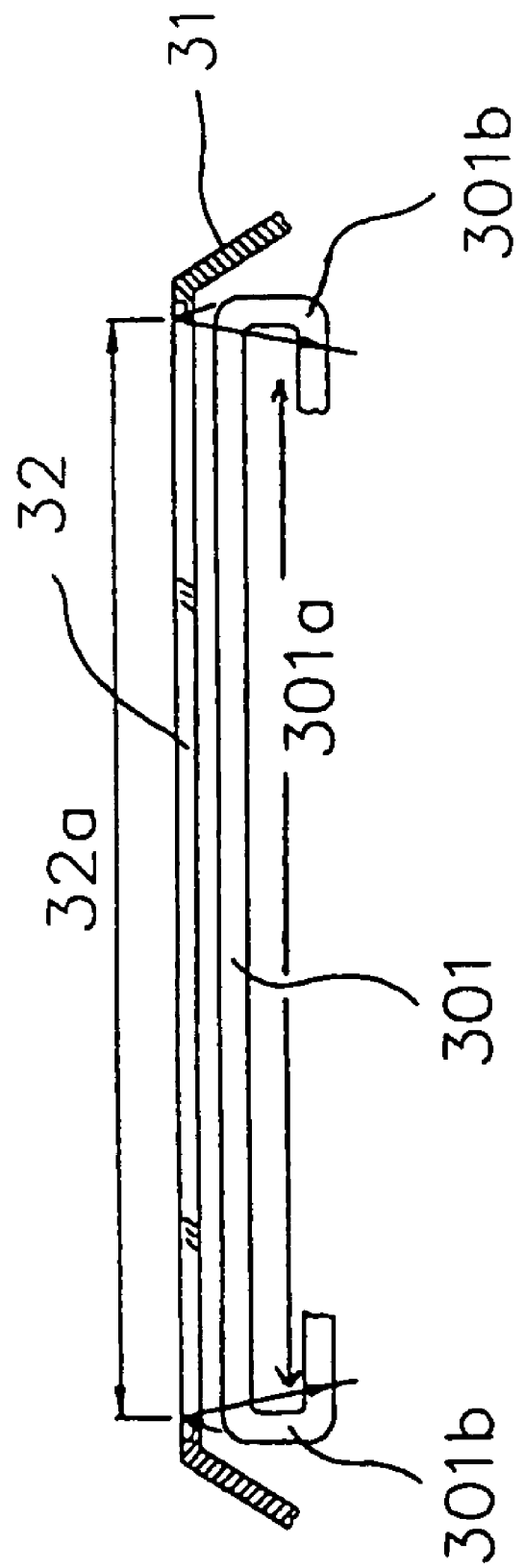
FIG. 8 shows a second embodiment of the present invention.

Another embodiment of the present invention is shown is FIG. 8, which has a different design of the bent light tube 301. Each end of the lighting tube is bent twice to form a U-shaped end section 301b. The lighting tube offers the same function as the first embodiment. The scan window 32 has an effective scanning area 32a. The element 31 supports the scan window 32 on the frame.

It should be noted that the shape of the bent end section is not limited to single bend or right angles. The end section may be bent either parallel to the window (to be illustrated in the following embodiments) or perpendicular to the window. All these modifications are within the scope of this invention.

Figure 9:
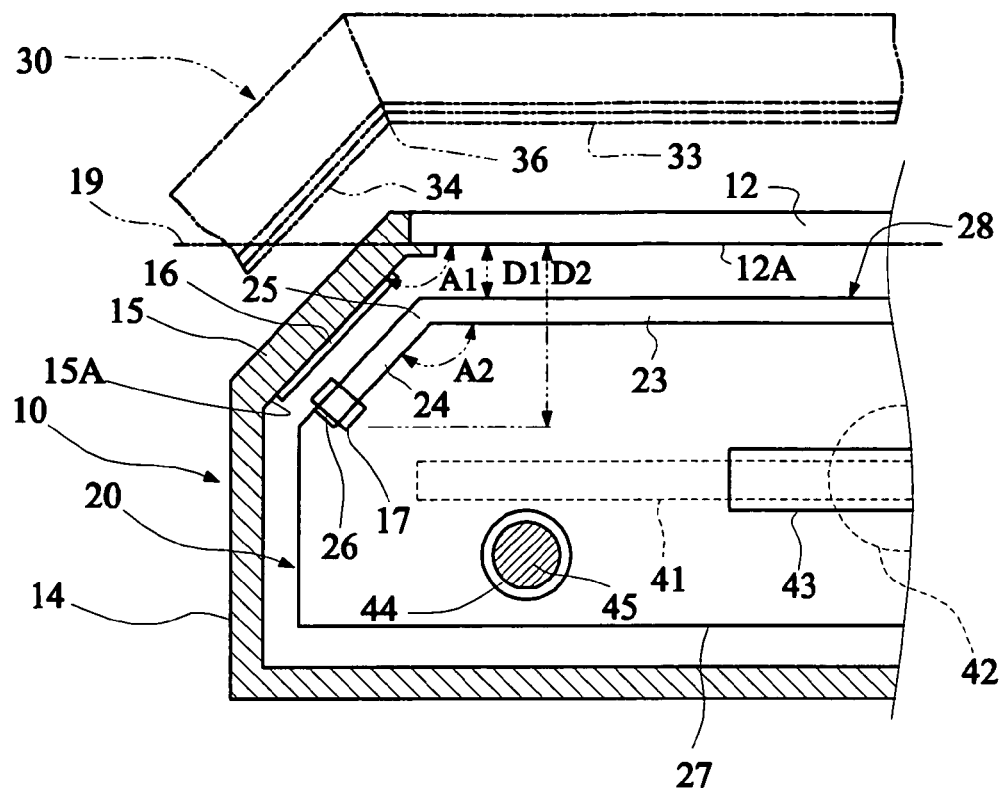
FIG. 9 is a partially schematic illustration showing a book scanner according to a third embodiment of the invention.

FIG. 9 is a partially schematic illustration showing a book scanner according to a third embodiment of the invention. As shown in FIG. 9, the book scanner 10 of this embodiment is for scanning a book 30. The book 30 has a first inner surface 33, a second inner surface 34, and a ridge 36 connecting the first inner surface 33 to the second inner surface 34 in an open state. The ridge 36 corresponds to the binding edge of the book 30, and the ridge 36 of FIG. 9 is perpendicular to the paper plane, so the ridge 36 only can be seen as one point. The book scanner 10 includes a transparent platen 12, a housing 14, and a scanning module 20. The transparent platen 12 is for supporting the first inner surface 33 of the book 30. The housing 14 has a housing platen 15 for supporting the second inner surface 34 of the book 30, and the housing platen 15 is connected to the transparent platen 12 to define a first angle A1 smaller than 180 degrees. It is to be noted that the connection between the housing platen 15 and the transparent platen 12 is not limited to the illustrated structure in the drawing. Instead, any connection structure capable of forming the first angle A1 can be used without departing from the range of the invention. For example, the housing platen 15 and the transparent platen 12 may be integrally formed into a one-piece structure. Thus, the housing platen 15 and the transparent platen 12 may have the one-piece structure formed of or from the transparent material. The scanning module 20 moves along a direction parallel to the ridge 36 and is for scanning the first inner surface 33 of the book 30. Typically, the scanning module 20 has one sleeve 44 matched with a guiding rod 45 in order to make the scanning module 20 movable back and forth along the guiding rod 45. The scanning module 20 includes a bent lighting device 28, a reflecting mirror 41, a lens 42, and an image sensor 43. The lighting device 28 outputs light rays to the first inner surface 33 of the book 30. The reflecting mirror 41 reflects the light rays, which are reflected from the first inner surface 33 of the book 30, to the lens 42. Then, the lens 42 focuses the light rays on the image sensor 43. The image sensor 43 receives the optical signals and then performs the subsequent conversion to complete the image scanning procedure.

The lighting device 28 includes a first sector 23 and a second sector 24. The first sector 23 is parallel to the transparent platen 12, while the second sector 24 substantially parallel to the housing platen 15 has a first end 25 connected to the first sector 23 and a second end 26. The first sector 23 and the second sector 24 define a second angle A2 smaller than 180 degrees and a second plane 27 substantially perpendicular to the transparent platen 12. The first angle A1 may be equal to the second angle A2, or slightly greater or smaller than the second angle A2. It is to be noted that in another embodiment, the second plane 27 also cannot be perpendicular to the transparent platen 12.

The first end 25 is closer to the transparent platen 12 than the second end 26 is, so that the second sector 24 can assist the first sector 23 in providing even light rays to enhance the edge image quality. Specifically speaking, a shortest distance D1 from the first end 25 to the transparent platen 12 is smaller than a shortest distance D2 from the second end 26 to an extending plane of the transparent platen 12. Thus, the first end 25 of the second sector 24 is closer to a first plane 19, which contains the transparent platen 12, than the second end 26 is.

The book scanner 10 may further include a reflective layer 16 and a first fixer 17. The reflective layer 16 may be a piece of reflecting mirror or a layer of reflective label, which is arranged on an inner surface 45A of the housing platen 15 and faces the second sector 24 of the lighting device 28, for reflecting the light rays outputted from the second sector 24 of the lighting device 28 to the vicinity of the ridge 36 of the book 30. The first fixer 17 fixes the second sector 24 of the lighting device 28 to the scanning module 20. The first fixer 17 and the inner surface 15A are separated by a small gap. However, the first fixer 17 and the inner surface 15A of the housing platen 15 also can be in sliding contact with each other, which will be described later.

Figure 10:
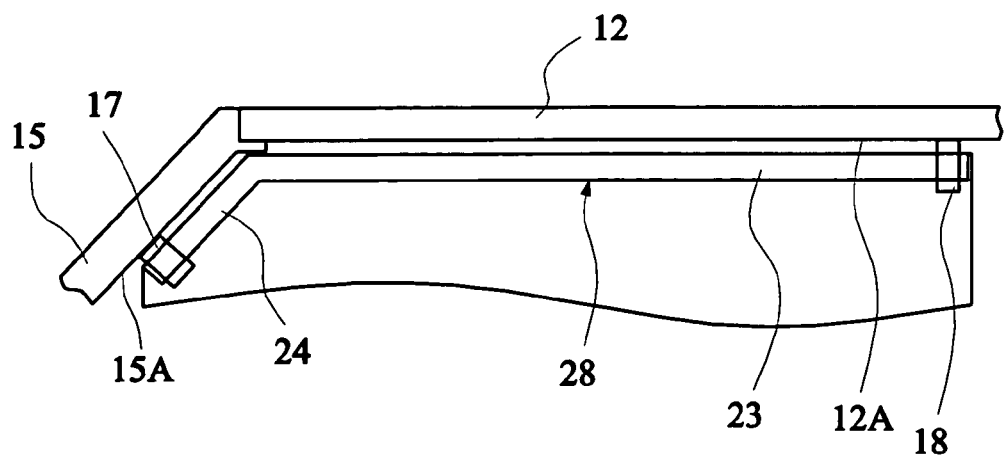
FIG. 10 is a partially schematic illustration showing a book scanner according to a fourth embodiment of the invention.

FIG. 10 is a partially schematic illustration showing a book scanner according to a fourth embodiment of the invention. As shown in FIG. 10, the first fixer 17 of this embodiment is in sliding contact with the inner surface 15A of the housing platen 15. In addition, the book scanner of this embodiment further includes a second fixer 18 for fixing the first sector 23 of the lighting device 28 to the scanning module 20. The second fixer 18 and an inner surface 12A of the transparent platen 12 are in sliding contact with each other. Making the first and second fixers 17 and 18 in sliding contact with the inner surface 15A of the housing platen 15 and the inner surface 12A of the transparent platen 12 may optimize the light rays provided by the lighting device 28, which is now achieved using the bent lighting device in conjunction with the slanting structure of the housing platen 15 of the invention. The extra light rays provided by the second sector 24 of the bent lighting device 28 may solve the problem of insufficient edge brightness. In addition, using the reflective layer 16 may further reflect the light rays to the vicinity of the ridge 36 of the book 30, and the scanned edge image quality may be enhanced accordingly. In addition, because the first and second fixers 17 and 18 are fixed to the lighting device 28 at linear fixing portions of the lighting device 28, the fixing method is simple and low-cost method. Thus, the problems encountered in the prior art may be completely overcome.

In the embodiments of FIGS. 9 and 10, the lighting device 28 is a cold cathode fluorescent lamp (CCFL). However, the lighting device 28 also can be other assemblies capable of outputting light rays.

Figure 11:
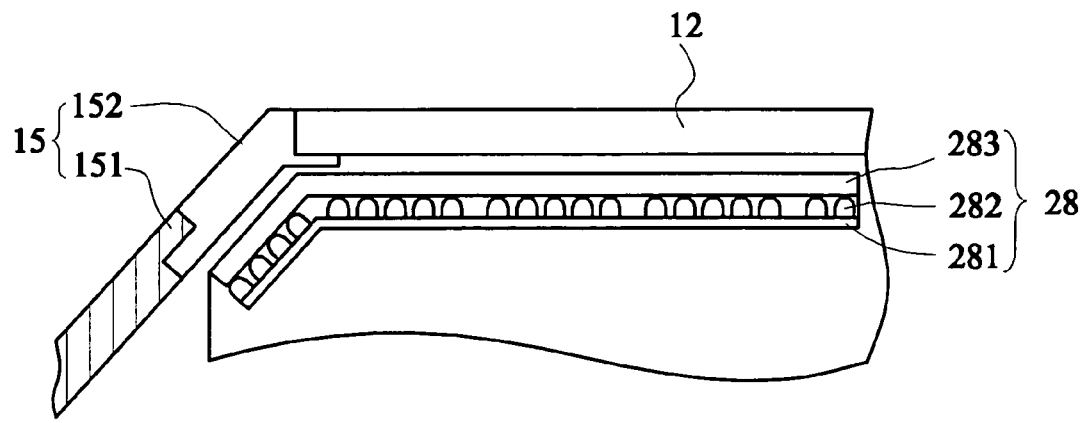
FIG. 11 is a partially schematic illustration showing a book scanner according to a fifth embodiment of the invention.

FIG. 11 is a partially schematic illustration showing a book scanner according to a fifth embodiment of the invention. As shown in FIG. 11, the book scanner of this embodiment is similar to that of the fourth embodiment, but differs from the fourth embodiment in that the lighting device 28 includes a circuit board 281, a plurality of LEDs (Light-Emitting Diodes) 282 on the circuit board 281, and a light-guiding rod 283. The light-guiding rod 283 located above the LEDs 282 homogenizes the light rays outputted from the LEDs 282 in order to provide even light rays to illuminates the document. It is to be noted that the LED 282 also may be an organic light-emitting diode (OLED). In addition, the housing platen 15 in this embodiment is composed of a base 151 and an adapter 152. The adapter 152 serving as the connection medium between the base 151 and the transparent platen 12 connects the base 151 to the transparent platen 12.

Figure 12:
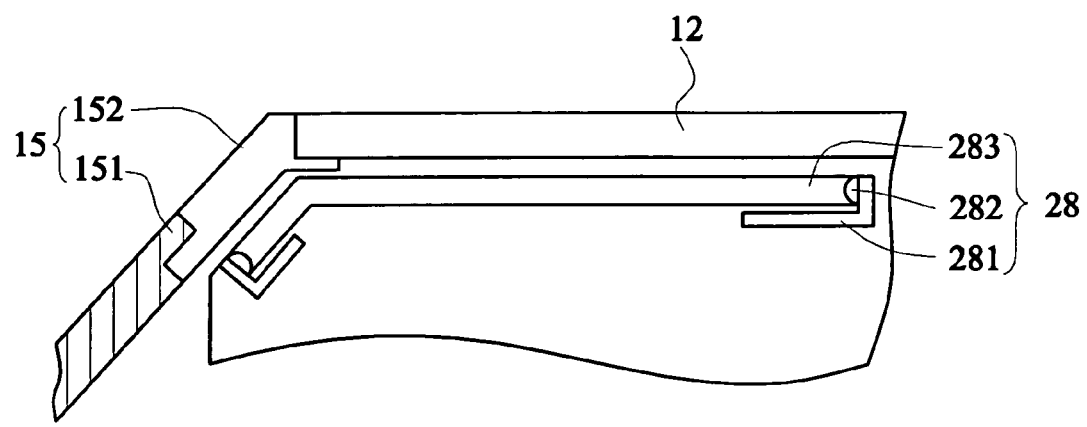
FIG. 12 is a partially schematic illustration showing a book scanner according to a sixth embodiment of the invention.

FIG. 12 is a partially schematic illustration showing a book scanner according to a sixth embodiment of the invention. As shown in FIG. 12, the embodiment is similar to the fifth embodiment but differs from the fifth embodiment in that the lighting device 28 of this embodiment includes a circuit board 281, two LEDs 282, and a light-guiding rod 283. The LEDs 282 is positioned at two ends of the light-guiding rod 283. The light-guiding rod 283 homogenizes the light rays outputted from the LEDs 282 in order to provide the even light rays. The two circuit boards 281, on which the LEDs 282 are mounted, are located at two ends of the light-guiding rod 283. It is to be noted that the two circuit boards 281 also may be merged into one circuit board, and the two LEDs 282 may be the organic light-emitting diode (OLED).

Consequently, according to the bent lighting device with the above-mentioned structure of the invention, the edge brightness of the lighting device may be effectively compensated such that the scanned edge image quality may be effectively enhanced. In addition, adding the adapter may make the processes for assembling the transparent platen and the housing and design changes more flexible. For example, the reflective layer 16 of FIG. 9 may be directly applied to the adapter 152 in FIG. 11 or 12 so as to simplify the manufacturing processes.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A book scanner for scanning a book having a first inner surface, a second inner surface, and a ridge connecting the first inner surface to the second inner surface in an open state, the book scanner comprising:
    a transparent platen for supporting the first inner surface of the book;
    a housing having a housing platen for supporting the second inner surface of the book, wherein the housing platen is connected to the transparent platen to define a first angle smaller than 180 degrees;
    a scanning module, which moves along a direction substantially parallel to the ridge and is for scanning the first inner surface of the book, wherein the scanning module comprises a lighting device, which comprises:
        a first sector substantially parallel to the transparent platen; and
        a second sector, substantially parallel to the housing platen, having a first end connected to the first sector and a second end, wherein the first and second sectors define a second angle smaller than 180 degrees, and the first end is closer to a first plane containing the transparent platen than the second end is so that even light rays are provided to enhance an edge image quality; and
    a reflective layer, which is arranged on an inner surface of the housing platen, for reflecting the light rays outputted from the second sector of the lighting device to the vicinity of the ridge of the book.

2. The book scanner according to claim 1, wherein the first angle is substantially equal to the second angle.

3. The book scanner according to claim 1, wherein the scanning module further comprises:
    a reflecting mirror, a lens and an image sensor, wherein the reflecting mirror reflects the light rays, which are reflected from the book, through the lens and then to the image sensor.

4. The book scanner according to claim 1, wherein the first sector and the second sector define a second plane substantially perpendicular to the transparent platen.

5. The book scanner according to claim 1, wherein the housing platen and the transparent platen are integrally formed into a one-piece structure.

6. The book scanner according to claim 1, wherein the lighting device is a cold cathode fluorescent lamp.

7. The book scanner according to claim 1, wherein the lighting device comprises:
    a circuit board;
    a plurality of LEDs (Light-Emitting Diodes) on the circuit board; and
    a light-guiding component, which is located above the LEDs, for homogenizing the light rays outputted from the LEDs so as to provide the even light rays.

8. The book scanner according to claim 7, wherein each of the LEDs is an organic light-emitting diode (OLED).

9. The book scanner according to claim 1, wherein the lighting device comprises:
    two LEDs; and
    a light-guiding component, wherein the LEDs are located at two ends of the light-guiding component, and the light-guiding component homogenizes the light rays outputted from the LEDs so as to provide the even light rays.

10. The book scanner according to claim 9, wherein the lighting device further comprises:
    a circuit board on which the LEDs are mounted.

11. The book scanner according to claim 9, wherein the lighting device further comprises:
    two circuit boards on which the LEDs are mounted, respectively.

12. The book scanner according to claim 9, wherein each of the LEDs is an organic light-emitting diode (OLED).

13. The book scanner according to claim 1, wherein the housing platen comprises:
    a base; and
    an adapter for connecting the base to the transparent platen.

14. The book scanner according to claim 1, further comprising:
    a first fixer for fixing the second sector of the lighting device to the scanning module.

15. The book scanner according to claim 14, wherein the first fixer is in sliding contact with the inner surface of the housing platen.

16. The book scanner according to claim 14, further comprising:
    a second fixer for fixing the first sector of the lighting device to the scanning module.

17. The book scanner according to claim 16, wherein the first fixer is in sliding contact with the inner surface of the housing platen, and the second fixer is in sliding contact with an inner surface of the transparent platen.

* * * * *